United States Patent
Takacs et al.

[11] 4,406,795
[45] Sep. 27, 1983

[54] EXTRACTION PROCESS

[75] Inventors: István Takács; György Kerey; Péter Rudolf; János Illés; Béla Szabó; Endre Vereczkey; Zoltán Bános; Gyula Bosits; László Czebe, all of Budapest, Hungary

[73] Assignee: Richter Gedeon Vegyeszeti Gyar Rt., Budapest, Hungary

[21] Appl. No.: 281,646

[22] Filed: Jul. 9, 1981

Related U.S. Application Data

[62] Division of Ser. No. 131,887, Mar. 19, 1980.

[30] Foreign Application Priority Data

Mar. 21, 1979 [HU] Hungary ............................ RI-703

[51] Int. Cl.³ ............................................. C02F 1/00
[52] U.S. Cl. .................................. 210/771; 210/774; 210/780
[58] Field of Search ............... 210/609, 771, 774, 784, 210/737, 738, 768-770, 780

[56] References Cited

U.S. PATENT DOCUMENTS

| | | | |
|---|---|---|---|
| 3,348,599 | 10/1967 | Lohstoeter et al. | 210/771 X |
| 3,360,869 | 1/1968 | Muller | 210/771 X |
| 3,697,417 | 10/1972 | Teletzke et al. | 210/609 |
| 3,959,125 | 5/1976 | Teletzke | 210/609 X |
| 4,133,756 | 1/1979 | Arai et al. | 210/771 X |

Primary Examiner—Thomas G. Wyse
Attorney, Agent, or Firm—Karl F. Ross; Herbert Dubno

[57] ABSTRACT

The invention relates to a process for the extraction of solids from liquids containing solids granulated by heat effect and/or solids the moisture content of which is reducible by heat effect, especially from colloidal solutions with protein content, suspensions and slurries for reducing the fat content of the solid material, in the course of this process grains are formed in the liquid with heat effect, or the moisture content of the grains is reduced, then they are removed from the liquids and dried. The equipment for implementation of the process is also subject of the invention.

The process is characterized by heating the liquid to 50°-125° C. temperature with heat transfer ("instant heating") for a short period, maximum for 2 minutes, then the heated material is kept at 50°-125° C. temperature for at least 2, preferably for 5-15 minutes. This is followed by separation of the grains from the liquid phase with filtration in a space containing vapor of 50°-125° C. temperature, the filtration process carried out in minimum 4, preferably in 8-15 minutes. Should the solid material contain fat, then at least a certain part of the fat is melted with the heat treatment processes. Finally the wet solid material separated from the liquid is dried. The equipment is provided with collection tank, instant heater, preferably with gravitational filter arranged in closed space, as well as with a drier. These are united in a closed system with pipelines and feeder device(s), with one or several pumps incorporated in the system.

Advantage of the invention is that the extraction of the solid content of solutions, slurries etc., which are difficult to treat and reduction of the possible fat content of the solid material are realized with a simple means in such a way, that an excellent end-product is available in respect of both the qualitative and other utilization properties.

7 Claims, 2 Drawing Figures

EXTRACTION PROCESS

This is a division of application Ser. No. 131,887, filed Mar. 19, 1980.

FIELD OF THE INVENTION

The invention relates to a process for the extraction of solid material from liquid containing solids granulated by heat effect and/or solids the moisture content of which can be reduced by heating, e.g. from slurry with protein content, colloidal solutions and suspensions—and in case of fat content—for reducing the fat content of the solid material.

BACKGROUND OF THE INVENTION

There are solutions, slurries, suspensions and similar materials of organic origin in several industrial sectors, which have colloidal or granular solid phases (dry substance content) capable of absorbing large amount of moisture. The plastic grains of such materials containing large amounts of water can be partially dewatered by a heating effect, or the colloidal component can be granulated by heat effect. Since the mentioned materials can cause environment pollution and may certain valuable components utilizable for instance for animal feeding, industrial or agricultural purposes, the efforts of experts have been aimed at the extraction of valuable substances, and at the elimination of environment-damaging properties.

In slaughterhouses for instance large amount of waste materials, waste waters of high protein—and fat content are produced. Treatment of wastes and waste waters derived from slaughtering, splitting and gut cleaning plants causes many problems because the water consumption is very high in these plant units. Thus the waste waters contain the organic impurities in a highly diluted, often partially or completely dissolved state. Also the organic dry substance content of the canning industrial waste water is very high. In the organo-therapeutic drug production, the valuable active ingredient is produced from animal organs, and treatment of organ fragments free from active ingredients derived in the course of production cause serious problems. The same applies to the waste material—occasionally of very high nutritive value—derived from agricultural and pharmaceutical frementation processes. The sludges of both communal and animal husbandry waste waters contain valuable materials which can be utilized, if extracted in a suitable form. However, so far no solution has been found for the economical extraction of the valuable material of suitable quality, e.g. protein, heparin, etc. from such wastes. Disadvantages of the presently known procedures are: multi-step, intermittent operation, no closed system exists, they are incapable of preventing the valuable materials of the wastes from decomposition and degradation. For instance processing of the raw materials collected for the purpose of meatmeal production begins in every case with the collection of the material. Thus decomposition and propagation of microorganisms begins even before the heat treatment. The intermittently treated material is stored periodically, and decay, decomposition and re-contamination set in. The heat treated material is to be dried, ground and finally its fat is extracted.

The fat extraction causes serious problems to the experts not only in the meatmeal production, but in other fields as well. The general characteristic of the solid grains present in the meat industrial waste waters (e.g. scraps of meat, intestinal villi, other undissolved by-products of high water content, e.g. large intestine with excrement, chitterlings, etc.) is the high fat content formed by the so-called surface and structural fats. Though part of the surface fat (fat tissues) can be removed before the meat processing with laborious manual work, these operations are not carried out in practice; the structural fat—representing the major part of the fat content—is not removable by preliminary cleaning. Although the voluminous offals are cut up roughly before processing, the fat cannot be removed in the course of cooking, heat treatment, then drying after the cutting. Consequently storable, non-sticky, non-rancid end product from meatmeal can be obtained only in grinding and partial fat extraction with organic solvents are carried out. This subsequent fat extraction entails not only significant cost (material, labor force, energy, investment), but an explosion hazard with solvents used in the plant. The method wherein cutting up the material enables the bulk of the fats to be melted with non-explosive medium, e.g. with hot water, then after removal of the melted fat and hot water the partially fat extracted fibres can be dried without after treatment, is not applicable rationally in practice. Separation of the solids of high water content and of very small grain size from the slurry (e.g. by filter press, filter drum, filter centrifuge) is not realizable, because the tiny grains clog the filter surface and a solid layer is formed. Separation of the fines from the slurry is then possible only with extremely costly screw separators and decanters requiring constant supervision. Decanter-type separation is used for instance for the separation of the protein fiber—derived at the so-called wet melting of lard carried out with 92–96° C. steam—from the wet dissolved fat, and from extraction of plastic grains with high water content from the melted and heat treated blood.

OBJECT OF THE INVENTION

The object of the invention is to provide a process for the extraction of solids from liquid-containing solids granulated by heat and/or solids whose moisture content is reduced by heat effect, e.g. from a slurry, colloidal solutions and suspensions, such that the solid phase can be separated from the liquid phase by a filtering process without the use of a decanter, and whereby materials, e.g. proteins present in the solid phase, do not deteriorate during the process, and most of the fat is removed from the material during the process without additional processing, e.g. without fat extraction with chemicals.

SUMMARY OF THE INVENTION

The invention is based on the following.

The enzymes present in the organic materials derived from the living animal or plant organs, or produced by microorganisms bring about decomposition, self-digestion, decay, etc. Consequently deterioration occurs of the active ingredient in the material stored generally under non-sterile circumstances. This can be eliminated when the enzyme action is continuously and practically completely prevented by killing the enzyme-producing microorganism or by preventing propagation; eliminating microbial re-contamination and creating a bacteriostatic condition for the possibly remaining microorganisms by a unique process. Furthermore if the liquid (e.g. slurry) containing material of high fat and protein content, ground to be very fine, or in the form of a fine precipitate is heated momentarily, the grains are formed, and the partial dewatering of the grains occur, finally the main bulk of the surface and structural fat present in the material melts. By keeping the material heated, aggregation and dewatering of the grains continue, the grains are stabilized, and the fat remains in melted condition. Such material can be perfectly filtered even in a gravitational field and the melted fat can be removed with the filtrate, hence the extremely costly subsequent fat extraction with an organic solvent is no longer necessary.

According to the invention the liquid is heated by heat transfer for a short time, a maximum for 2 minutes (instant heating) to a temperature of 50°–125° C. heated material is kept at a temperature of 50°–125° C. for a minimum of 2 minutes, preferably for 5–13 minutes and—if fat is present in the solid material—at least a certain part of the fat is melted from the solid material by the heat treatment processes. Then the grains are separated from the liquid phase by filtration in a space containing vapour at a temperature of 50°–125° C., the filtering process being continued for a minimum of 4 minutes preferably for 8–15 minutes. Then the wet solid material separated from the liquid phase is dried.

Advantages of the invention can be summed up as follows:

Extraction of solids of colloidal solutions, slurries, and suspensions which are difficult to treat with the present methods is realized by the invention with simple means such that the end-product is excellent in respect of both the qualitative and other utilization properties. Its moisture content can be 5–10%. Prior to the treatment the material—if necessary—can be cut up to minimal grain size, and the cutting device may form part of a closed system consisting of the instant heater, heat holding device, filter and drier. The closed system allows the processing of the wastes to valuable material under ideal circumstances (e.g. by elimination of decomposition, exclusion of stench). Propagation of the microorganisms and enzyme action are stopped by the instant heating at the beginning of the process, and the enzyme action is eliminated in the entire process by the further operations carried out in the closed system. Should the waste contain fat, then the fat extraction takes place automatically during the process as a side effect of the series of operations according to the invention, and as a result of the complete process, the valuable raw materials are available in the form of amorphous grains with a large specific surface without the risk of contamination and re-contamination. The dry material obtained as the endproduct is of permanent composition, stable, easily storable and its active ingredient is eminently extractable.

The equipment consists of machines assembled in a block-like, closed unit; the space requirement is small. Thus the apparatus can be installed at the place of origin of the liquid to be treated, e.g. in slaughter-house. At the same time the closed system excludes the risk of interim contamination. Machine units of the equipment are structurally simple, r.p.m. is low, instrumentation is handy, the handling requires a minimal labor force. The investment costs are relatively low, the specific power consumption of the operation is low.

SPECIFIC DESCRIPTION

Figure 1:
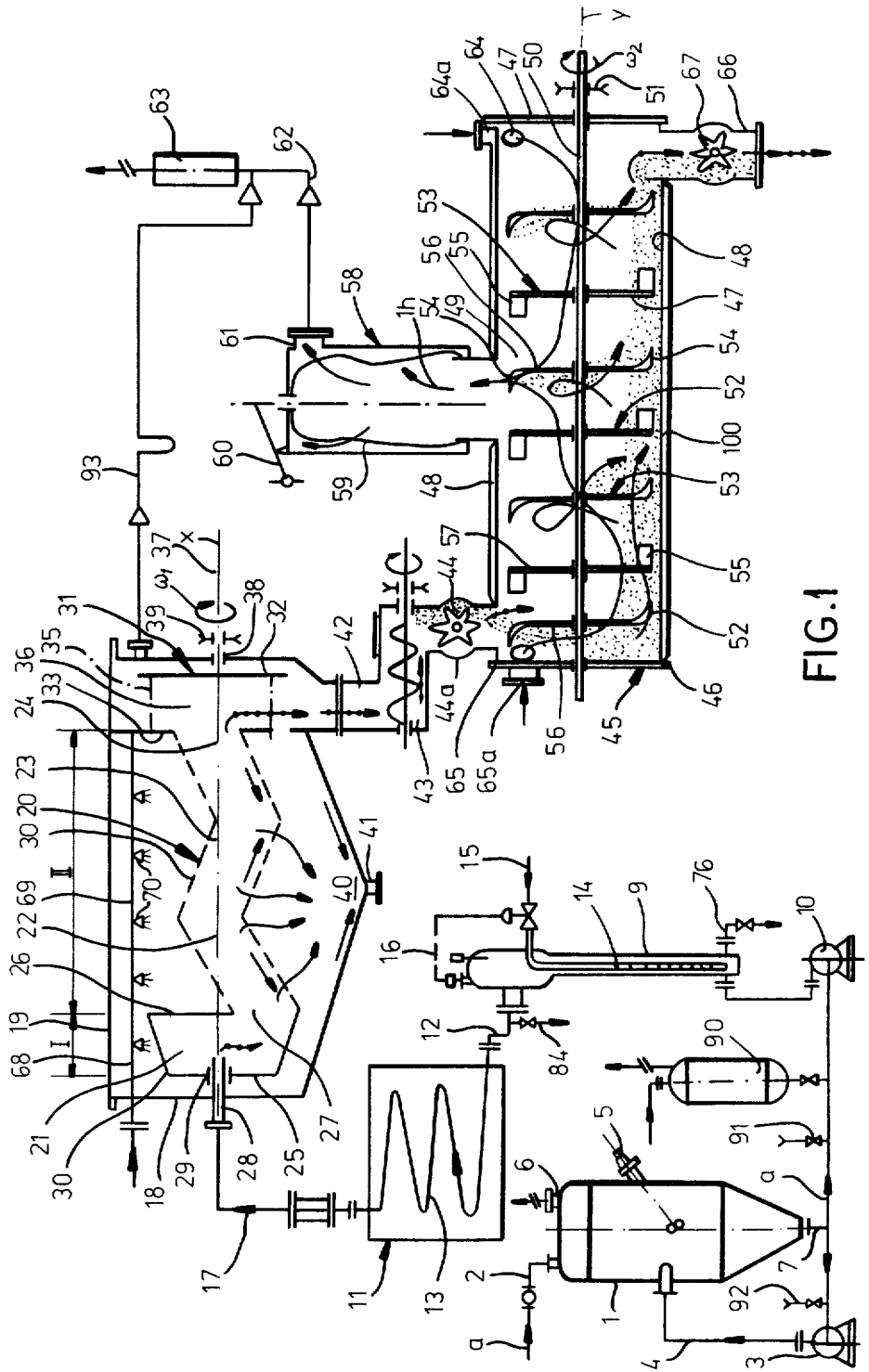
FIG. 1 is a diagrammatic vertical section of a embodiment of the apparatus.

As shown in FIG. 1, the has a tank 1, feeding pipe 2 and recirculating pipe 4, containing the slurry pump 3 leading tangentially into it. A mixer device 5 extends into the tank 1. Pipe 7 emerges from the lower part of the tank, from which the recirculating pipe 4 is branched off, and the delivery pipe 8 extends into the instant heater a, containing the perforated pipe 14. Feeder pump 10 is built into the pipe 8 between tank 1 and instant heater 9. The instant heater 9 is connected with the heat holding unit 11 through pipe 12, the heat holding unit being fitted with the insulated pipe 13. This is connected with the steam pipe 15 outside the instant heater, said steam pipe includes the control unit 16.

In order to keep the instant heater 9, heat holding unit 11 and filter 18 to be described at a later stage, internally clean, a washing water tank 90 is connected with pipe 8 between the homogenizing tank 1 and pump 10 and both the hot and cold water washing of the mentioned machine units can be carried out in tank 90. Through feeder funnel 91 disinfectant too can be admitted into the system by pump 10. For washing of the collecting-homogenizing tank 1, the feeder funnel 92 and pump 3 are used to feed in the liquid.

The heat holding unit 11 is connected with the filter 18 by pipe 17. In the filter 18 a hollow body 20 is rotatable around the longitudinal horizontal axis x in a closed housing 19. The hollow body 20 has first section and a second section. The first section is formed by the truncated pyramid shaped drum 21 and the second section by the polygonal prismatic members 22, 23 and 24 rigidly interconnected in a zig-zag line. The end plates 25 and 26 of drum 21 are made of metal plate, the large end plate is provided with an excentrically arranged polygonal opening 27, connected with the first member 22 of the second section in such a way, that the longitudinal axis of members 22, 23, 24 intersect the geometrical axis of rotation x outside the drum 21. Pipe 28 leading axially into the interior of drum 21 through the small end plate 25 of drum 21 forms the rotation support of the hollow body 20 with its bearing 29. The pipe 17 emerging from the heat holding unit 11 is connected to pipe 28. Sides of the drum 21 and members 22, 23 and 24 are formed—at least in part—by filter surfaces 30. The prismatic member 24 farthest from the drum 21 leads into box 31, which rotates with the hollow body 20 and is open along its circumference. The box 31 is formed by two parallel circular, vertically arranged plates 32 and 34, held together by staybolts 35. The internal plate 33 has a central opening 36, the last prismatic member leading into it, while the shaft 37 for rotation of the whole hollow body 20 is connected with the external plate. The shaft 37 being rotated in bearing 38 and connected with drive 39. The direction of rotation is indicated by arrow $\omega_7$. The lower part of housing 19 is formed as a trough 40, from the deepest point of which pipe stub 41 emerges, through which the filtrate is discharged. Pipe 42 is below box 39, leading into one of the ends of a worm conveyor housing. The other end of the worm conveyor 43 is connected to pipe 44a including a cell feeder 44 for supplying material through the pipe 44a to a contact-fluid drier 45. A washing devid 68 is built into the filter 18 and consist of pipe 69 and spray heads 70 mounted on it. The pipe 69 is connected to a pump outside the filter. The washing device 68 serves for the external washing of the hollow body 20; water, steam, high-pressure hot water, compressed air, etc., may be used as the washing agent. Pipe 93 emerges from the upper part of housing 19 and leads into the deodorizer 63. The vapors generated in housing 19 pass into the deodorizer. The deodorizer 63 may be a conventional wet washing absorber or similar device.

The drier 45 has a horizontally arranged cylindrical housing, end plates 46 and 47 and a double cylindrical wall or jacket 48 which surround a closed space 40. Driving shaft 50 runs along the horizontal longitudinal geometrical axis y of the drier 45 and is connected to a drive schematically shown at 51. Discs 52 and 53 are spaced from each other and are rigidly fixed to shaft 50, and the adjacent discs together with the cylindrical wall 48 form cells. Scraper-mixer blades 54 are mounted in the circumferential regions of the discs 52, while free-running rollers 55 are mounted in the circumferential region of discs 53. Every second disc is provided with scraper-mixer blades and rollers, e.g. four on each disc uniformly spaced (at 90°). Discs 52 have openings 56 in the region of drive shaft 50, while the openings 57 are proved in the circumferential range of discs 53 carrying the rollers 55. Both the blades 54 and rollers 55—the axis of rotation of which is parallel with the longitudinal symmetry axis x—are arranged with a small clearance from the internal surface of the cylindrical wall 48; the spacing between the rollers and cylindrical wall surface may be varied as necessary. A dust separator pipe extends upwards from the central part of the drier house 45, the dust separator having a dust bag 59; this is connected with a vibrator 60. A dust separating cyclone can also be used instead of dust bag. Pipe stub 61 joins the upper part of the dust separator 58 to pipeline 62 which is led into the deodorizer 63. Each of the two upper ends of the cylindrical housing of filter 45 have drying gas inlet openings 64 and 65, with pipe stubs 64a and 65a attached to them on the outside. From the interior 49 of the cylindrical house at the end opposite the inlet side, the pipe 66 extends downwardly and has a cell feeder 67. Such drying equipment is described in detail in the application Ser. No. 097,963 filed Nov. 28, 1979.

Figure 2:
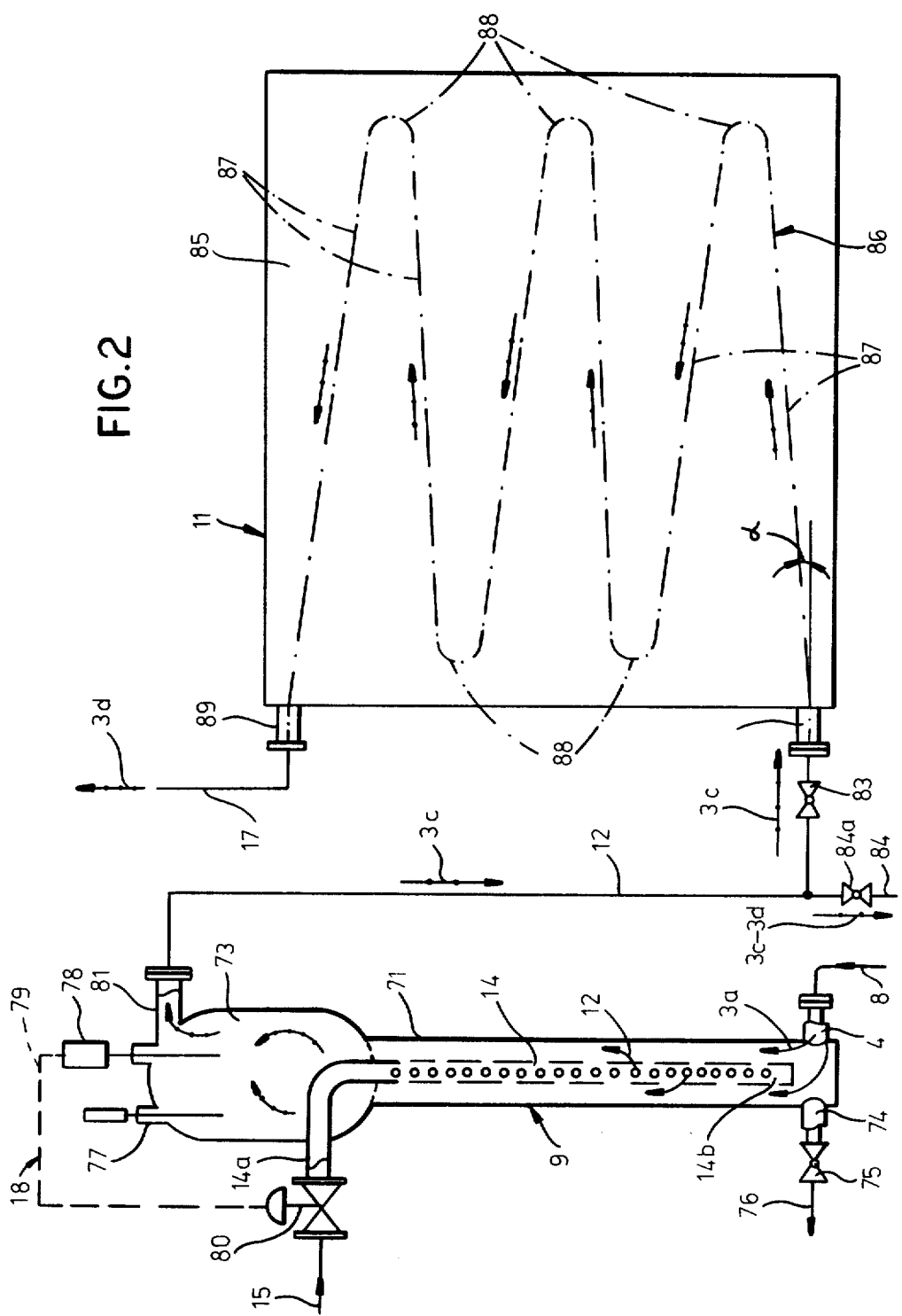
FIG. 2 is a diagram of the instant heater and heat holding unit of FIG. 1 drawn to a larger scale.

FIG. 2 shows the instant heater 9 and heat holding unit 11 and their interconnection in detail. The heat holding unit 9 has a vertically arranged pipe 71 with pipe 8 leading into it through pipe stub 72 at the bottom, and it emerges through pipe stub 74, while the expanding tank 73 is attached to the upper part without transition. Pipe 76 for drainage of liquid, containing the gate valve 75, is connected to pipe stub 74. The perforated pipe 14 runs along the vertical geometrical symmetry axis of pipe 71, its upper, non-perforated section 14a being bent at 90° and is led into the tank 73 from lateral direction at the bottom, and being provided with a control valve 80 outside the tank, as part of the control unit 16 shown in FIG. 1. The steam inlet pipe 15 is connected to the other side of the gate valve. The lower part of the perforated pipe 14 has an opening 14b. The control unit 16 has a thermometer 77 and temperature sensor 78 extending into tank 73 functionally connected with the control valve 80 through pipe 79. Pipe stub 81 emerges in a lateral direction and is connected to pipe 12 shown also in FIG. 1 and through which the instant heater 9 and the heat holding unit 11 are interconnected; it leads into the pipe stub 82 of the latter one, containing a locking device 83 before the pipe stub. Drain pipe 84 with locking device 84a built into it, is branched off pipe 12 before the locking device 83. The heat holding unit 11 has a pipe 86 (in box 85) shown with dash-dot lines, connected to pipe stub 82 at the bottom, and formed as an undulation running in a geometrically vertical plane, and consisting of straight pipe sections 87 and of the connected curved pipe sections 88. The angle of pitch $\alpha$ of the spiral is only a few degrees, preferably a maximum 10°. The complete pipeline 86 is heat insulated. Pipeline 86 ends at pipe stub 89 at the top, opening into pipeline 17; the latter connects the heat holding unit 11 with the filter 18 already described in detail.

The equipment according to the invention functions as follows:

The wet suspension mainly with protein content (containing protein dissolved in water), or colloidal jellylike solution the solid content of which is low, e.g. 2–5%, is collected into the collecting—homogenizer tank 2 (arrow a) at its place of origin, which tank serves for the purpose of the buffer tank as well. The homogenization is ensured with the slurry pump 3 and/or with the mixer device 4. The homogenization is favorable for carrying out the further processes. By the liquid treatment in the tank 1 the inactive accompanying substances are prevented from coagulation in the instant heater or in the heat holding unit, they do not adhere to the granulated material, thereby they are washed down easily from the grains during filtering and are removable with the filtrate.

The material is delivered from tank 1 with pump 5 into the instant heater 9, where steam of 75°–100° C. temperature and at a pressure reduced to 0.2–0.4 bar is conducted from pipe 15 through the perforated pipe 14 to the material for maximum 2 minutes. The amount of steam supply and the required temperature range can be ensured with the control unit 16 according to the existing demands. As a result of the instant heating, the components—mostly with protein content—of the material partially lose their hydrophile colloidal character and become separable from the remaining medium. Should the liquid contain therapeutically valuable material, e.g. heparin, this will be bound to the coagulating proteins separating nearly in their totality in the instant heater 9, thus in an easily filterable form develops. At the same time the binding of the accompanying substances to the coagulated protein—which would upset the further processing—can be reduced depending on the extent of pretreatment. As a result of the instant heatings, significant degermination and due to granulation preliminary dewatering too take place.

The granulated material passes from the instant heater 9 into the heat holding unit 11, where it dwells at 75°–100° C. temperature for at least 2, preferably for 5–12 minutes. Size of the grains—separating in flaky form, partially losing their hydrophilic character and water absorbing capacity—can be increased with heat holding, the coagulation process can be made complete or nearly complete, the grains become more "rigid", as a result of which the next process, the separation by filtration will be easier. In certain cases the efficiency of the granulation can be increased by adding chemicals to the material prior to the heat treatment. The degermination will be further increased with the heat holding unit 11.

The material is delivered from the heat holding unit 11 through pipe 17 into the filter 81, in the closed house 19 of which the filtering process is carried out in the temperature range of 60°–100° C., i.e. at the temperature of the instant heating and heat holding process. Preliminary dewatering of the material takes place in the rotary drum 21 of the first section, then the wet mass of material in the prismatic members 22, 23 and 24 of the second section II, is forced to a forward-backward motion (see dotted arrows), back sliding repeatedly, meanwhile dividing continuously, its dwelling period is extended, whereby the filter surfaces 30 are constantly cleaned, regenerated. The material in the hollow body 30 is separated to the filtrate and to the fraction containing 15–35% solids. In the source of separation the very favorable fractionalization too takes place, because a significant part of the non-granulated materials, and other accompanying substances, e.g. fat in liquid state, pass out through pipe stub 41 with the wet filtrate accumulating in tank 40, at the same time the major part of the valuable materials (97–99%) bound to the coagulated proteins are retained. When the accompanying substance is fat, it becomes liquid already in the process of instant heating and it can not get bound to the solids in the filter at the steam temperature, while due to the forward-backward movement in the hollow body 20, a considerable part of the liquid fat flows down. At the same time the industrially valuable material (e.g. heparin) present in the instant heater and heat holding unit settles without loss in the granulated solid phase, the utilizable material does not pass off with the filtrate. Since the rotary hollow body 20 (filter body) is in closed space, i.e. in hot steam space, the degermination process continues. As a result of the long residence time and constant two-directional, forward-backward movement, the granulation process continues, the smaller grains adhere to each other, consequently the grain size of the material passing through pipe 42 into the worm conveyor 43 is very favorably large.

If the filtrate passing through pipe stub 41 contains fat, then the fat should be passed into a conventional fat extractor (freezer-fat trap, separator, etc.). The fat-extracted filtrate can be recirculated as washing liquid into the hollow body 20, this way the inherent valuable materials remain in the process and are recoverable at least in part. The warm vapour ascending into the closed housing 19 is condensed and it passes off with the filtrate, or in certain cases it passes through pipe 93 into the deodorizer 63. The washing device 68 may also be used for the partial chemical treatment of the material during the continuous process of filtering—by spraying chemicals—or for pretreatment, e.g. fat is extracted from the material granulated with chemical treatment by using hot water, etc.

The hollow body 20 has a buffer-effect as a result of which the liquid concentration and composition fluctuations do not disturb the operation.

The material derived in the contact-fluid drier 45 is subjected simultaneously to the effect of contact heat transfer and convective heat transfer of mixed flow. The contact heat transfer takes place through the duplicated cylindrical wall without the heating medium conducted into the closed space 100. Progress of the material in the drying space divided into cells with the rotary discs 52 and 53 is considerably slowed down, the dwelling period is extended, thereby the material passing in the direction of the dotted arrows is kept in contact for a long time with the hot air flowing in the direction of the continuous arrows, blown in through openings 64 and 65. The material is dried at 100°–135° C. temperature with contact-fluid dier 45. The rollers 55 smear the material onto the internal cylindrical wall surface, and the dried layer of the material is dispersed into the air flow by scraper-mixer blades 54. A further role of the rollers 55 is to cut up the dried and separated material to the required grain size, which can be accomplished by the suitable adjustment of the distance from the internal surface of the cylindrical wall. The outgoing air is purified with the dust filter 58 and deodorizer 63. The end-product is discharged from the contact-fluid drier through cell feeder 66.

The end-product obtained from the contact-fluid drier 45 is of 90% solid substance (dry) content and of uniform grain size. As a result of the degermination continues in the course of this process, germ number of the end-product is $10-10^4$ pc/g. and with the use of special air filter this germ number can be further reduced to a value of a few spores/g.

SPECIFIC EXAMPLES

The process according to the invention is described in detail with the aid of examples as follows:

EXAMPLE 1

Protein-containing granular material is separated in the fat-plant of the slaughterhouse at the so-called wet-melting of lard on decanter with the use of 92°–96° C. temperature steam, the material having high fat and water content: the fat represents 25–35%, and the water 70–80% of the dry substance content.

According to the process the extraction of the protein fibre from this material is the following:

Hot material of 82° C. temperature is added to the continuously obtained granular material, and it is delivered into a collecting tank with screw pump of open hopper. The amount of water to be added should be sufficient to obtain 5–7% dry substance content for the slurry in the tank. The material accumulated in the tank is continuously recirculated with slurry pump, whereby it is partly homogenized, and partly the specific surface of the pulpy, lumpy material, granulated with heat treatment used at fat melting—in the interest of more effective fat reduction—is increased by cutting.

The mixture containing the homogenized and cut-up solid material is delivered with feeder pump into the instant heater of the equipment, where the temperature is increased to 92°–96° C. by direct blowing of steam at 0.5 bar pressure for 30 seconds The material flown at a slow rate in the spiral pipe (heat holding unit) is kept at the same temperature for 12 minutes.

The main bulk of the surface and structural fat content of the grains exposed to the heat effect is melted and mixed with the hot water medium. The protein containing solids cut up and pulped with instant heating and heat holding is coagulated, whereby aggregates of such grain size are obtained, which can be readily separated from the liquid phase by filtration, and the separated elastic grains are easily dryable. As a result of this heat effect significant part of the virulent germs is destroyed.

The protein containing grains coagulated to the heat effect are separated from the fat-containing water in gravitational filter, in vapour space 90° C. temperature with continuous operation. During filtration the material is washed with hot water of 82° C. temperature. The hot water is admitted through the spray heads arranged above the filter equipment.

The fat-containing filtrate is further treated with some kind of conventional method, while the protein-containing material freed from the major part of its fat content is continuously dried in contact-fluid drier, in which air of 140°–150° C. temperature is flown. The material is kept at 85°–95° C. temperature with the drying gas of such temperature and with the simultaneous contact heat transfer, remains in the drier for about 35 minutes. In this temperature range the material and the digestibility of the protein content do not deteriorate. The results of the analytical tests of the end-product are the following:

| water content | 7.8% | |
|---|---|---|
| protein content | 79.7% | |
| digestible protein | 97.4% | (in % of the total protein) |
| fat content | 11.8% | |
| germ number | 1500 pc/g. | |

The well-storable, inexpensively transportable product of low germ number, very high and well digestible protein content, with substantially reduced fat content in comparison with the product obtained with direct drying, can be used also for animal feeding and food industrial purposes, and its stable quality permits the optimal utilization.

EXAMPLE 2

Large intestine of cattle derived from the slaughterhouse is cut up—according to its rate of derivation—on industrial meat grinder and with the use of discs of 8 mm mesh size. The grinding containing about 17% dry substance is delivered into the collecting tank at the continuous feeding of 15°–25° C. water. The amount of water is selected as to obtain 4–7% dry substance content for the slurry. The mixture in the collecting tank is homogenized by recirculation with slurry pump. The homogenized material is delivered into the instant heater and there its temperature is increased to 87°–93° C. by directly blowing in steam of 0.5 bar pressure, and the material is kept at this temperature for about 12 minutes. The tertiary and quatern structure of the proteins present as dry substance in dissolved condition, or as colloidal suspension varies mostly irreversibly with the heat treatment, the grains lose their hydrophile character, become mostly insoluble in water, part of the structural water is discharged and become elastic granular coagulants well filterable even in gravitational field. An additional effect of the heat treatment the main bulk of the surface and structural fat melts and emulsifies with the wet medium; the germ number is greatly reduced, because even the virulent germs are destroyed.

The mainly protein-containing coagulant is separated from the liquid phase—which latter one contains mainly fat, and small quantity of protein-hydrolizates (perlides, peptides)—in vapour space of 90° C. temperature with continuous filtering. During filtration washing is used with water of 80° C. temperature for the purpose of further fat extraction. The filtered granular material is dried according to the method given in Example 1. The results of the analytical tests of the end-product are as follows:

| water content | 9.2% | |
|---|---|---|
| fat content | 9.7% | |
| protein content | 72.4% | |
| digestible protein | 96.2% | (in % of total protein) |
| germ number | 3500 pc/g. | |

Accordingly the product is of stable quantity, well storable, its germ number and fat content are substantially reduced in comparison with the original state, its protein content is high and well digestible in comparison with the meat-meals produced normally from intestines, it is eminently suitable for animal feeding purposes. Extra advantage is that as a result of the several heat treatment and continuous filtration and washing carried out in gravitational field, preliminary removal of the excrement from the large intestine is not necessary.

EXAMPLE 3

The blood continuously obtained from the slaughterhouse is treated with chemical, e.g. calcium chloride facilitating the coagulation, the congealment is gently cut up to 10–15 mm grains, mixed with water of 85° C. temperature and the obtained slurry is heated in instant heater to 95°–100° C. temperature with the use of direct steam blow at 0.5 bar pressure. The material is kept at this temperature for 8 minutes. Protein content of the chemically treated and cut up congealment loses its hydrophile character to the effect of heat treatment, elastic grains are formed becoming easily filterable. The about 25% dry substance content of the coagulant separated from the liquid phase during the filtration considerably exceeds the original 19% dry substance content of the blood. Due to this and to the fact that the water absorbing capacity of the proteins is significantly reduced, the drying as the next step can be carried out more favourably. The chemical facilitating the coagulation passes off continuously with the filtrate. The filtered grains are dried similarly in contact-fluid drier with the use of drying air of 120°–130° C. temperature. Dwelling period of the material in the drier is 25 minutes, outlet temperature of the air is 80°–85° C., dry substance content of the end-product 90%, other characteristic analytical data are the following:

| water content | 8.7% | |
|---|---|---|
| fat content | 0.4% | |
| protein content | 89.2% | |
| digestible protein | 98.0% | (in % of total protein) |
| germ number | 4800 pc/g. | |

Thus the obtained solid granulated material is of low germ number with high excellently digestible protein content, well storable product of stable quality, eminently suitable for animal feeding purposes.

Naturally the invention is not restricted to above process examples and to the concrete embodiment of the equipment, but it can be realized in several ways within the protective circle defined by the claim points. The example given for the large intestine of cattle applies according to the meaning to the processing of the large and small intestine of pig as well.

What we claim is:

1. A method of heat treating a biologically contaminatable material to obtain solids in a granular form and to remove fats therefrom, said method comprising the steps of:
   (a) passing said material in a liquid from through a heat exchanger with a residence time of a maximum of two minutes and at a temperature sufficient to heat said material to 50° C. to 125° C.;
   (b) thereafter continuously displacing said material along a storage path while maintaining it at a temperature of 50° to 125° C. for a minimum of two minutes thereby melting any fats contained in said material;

(c) filtering the material following hot storage in step (b) by introducing said material into one end of an elongate filter body having a plurality of angularly adjoining sections and rotating said body about a horizontal axis eccentric to said body in a closed housing containing vapor at a temperature of 50° to 125° C., thereby advancing solids from said material from one end of said body to the opposite end thereof and extracting a liquid phase from said material through a wall of said filter body, said solids being advanced through said body for a minimum of four minutes; and (d) drying the solids recovered from said opposite end of said body.

2. The method defined in claim 1 wherein said material has a residence time in step (b) of substantially 5 to 15 minutes and a residence time in said body in step (c) of substantially 8 to 15 minutes.

3. The method defined in claim 2 wherein said solids are dried in step (d) by exposing them to hot air at a temperature of 100° to 180° C. for a period of 20 to 40 minutes while agitating said solids in said hot air and advancing said solids along a horizontal path and sweeping said hot solids alternately inwardly and outwardly during displacement along said path.

4. The method defined in claim 3 wherein the material is heated in step (a) by direct steam heating at a pressure of 0.2 to 0.6 bar.

5. The method defined in claim 4 wherein steps (a), (b), (c) and (d) are carried out continuously in a closed system at a constant rate.

6. A method of heat treating a biologically contaminatable material to obtain solids in a granular from and to remove fats therefrom, said method comprising the steps of:

(a) passing said material in a liquid form through a heat exchanger with a residence time of a maximum of two minutes and at a temperature sufficient to heat said material to 50° C. to 125° C.;

(b) thereafter continuously displacing said material along a storage path while maintaining it at a temperature of 50° to 125° C. for a minimum of two minutes thereby melting any fats contained in said material;

(c) filtering the material following hot storage in step (b) by introducing said material into a rotating elongate filter body in a closed housing containing vapor at a temperature of 50° to 125° C., thereby advancing solids from said material from one end of said body to the opposite end thereof through said body and extracting a liquid phase from said material through a wall of said filter body, said solids being advanced through said body for a minimum of four minutes; and (d) drying the solids recovered from said opposite end of said body by exposing them to hot air at a temperature of 100° to 180° C. for a period of 20 to 40 minutes while agitating said solids in said hot air and advancing said solids along a horizontal path and sweeping said hot solids alternately inwardly and outwardly during displacement along said path.

7. A method of heat treating a biologically contaminatable material in the form of a slurry suspension or solution containing a solids-forming material and including water, proteins and fats to obtain solids in a granular form and to remove fats therefrom said method comprising the steps of:

(a) passing said material in a liquid form through a heat exchanger with a residence time of a maximum of two minutes and at a temperature sufficient to heat said material to 50° C. to 125° C. to coagulate solids in the liquid;

(b) thereafter continuously displacing said material along a storage path while maintaining it at a temperature of 50° to 125° C. for a minimum of two minutes thereby melting any fats contained in said material;

(c) filtering the material following hot storage in step (b) by introducing said material in a rotating elongate filter body in a closed housing containing vapor at a temperature of 50° to 125° C., thereby advancing solids from said material from one end of said body to the opposite end thereof and extracting a liquid phase from said material through a wall of said filter body, said solids being advanced through said body for a minimum of four minutes; and (d) drying the solids recovered from said opposite end of said body.

* * * * *